(12) United States Patent
Pearson, Jr.

(10) Patent No.: US 11,736,145 B2
(45) Date of Patent: Aug. 22, 2023

(54) GRADUATED FREQUENCY RESPONSE NON-CONTACTING SLIP RING PROBE

(71) Applicant: Moog Inc., East Aurora, NY (US)

(72) Inventor: Phil E. Pearson, Jr., Jupiter, FL (US)

(73) Assignee: Moog Inc., East Aurora, NY (US)

( * ) Notice: Subject to any disclaimer, the term of this patent is extended or adjusted under 35 U.S.C. 154(b) by 79 days.

(21) Appl. No.: 17/614,167

(22) PCT Filed: May 27, 2020

(86) PCT No.: PCT/US2020/034716
§ 371 (c)(1),
(2) Date: Nov. 24, 2021

(87) PCT Pub. No.: WO2020/243182
PCT Pub. Date: Dec. 3, 2020

(65) Prior Publication Data
US 2022/0216894 A1    Jul. 7, 2022

Related U.S. Application Data

(60) Provisional application No. 62/956,471, filed on Jan. 2, 2020, provisional application No. 62/853,484, filed on May 28, 2019.

(51) Int. Cl.
*H04B 5/00* (2006.01)
*H01P 1/06* (2006.01)
(Continued)

(52) U.S. Cl.
CPC ........... *H04B 5/0031* (2013.01); *H01P 1/062* (2013.01)

(58) Field of Classification Search
None
See application file for complete search history.

(56) References Cited

U.S. PATENT DOCUMENTS

| 4,327,334 A | 4/1982 | Becavin et al. |
| 5,892,411 A * | 4/1999 | Schwan ............... H04B 5/00 333/32 |

(Continued)

FOREIGN PATENT DOCUMENTS

| CN | 1898683 A | 1/2007 |
| CN | 101106211 A | 1/2008 |

(Continued)

OTHER PUBLICATIONS

International Search Report and Written Opinion dated Aug. 5, 2020, corresponding to International Patent Application No. PCT/US2020/034716, 18 pages.

(Continued)

*Primary Examiner* — Tuan A Tran
(74) *Attorney, Agent, or Firm* — Harter Secrest & Emery LLP

(57) ABSTRACT

A probe for receiving transmissions of electrical signals from a transmitter across an interface of a slip ring comprising a signal capture area comprising at least one segmented signal receiving strip arranged in spaced relation to the transmitter of the slip ring for receiving a signal transmitted across the interface of the slip ring. The segmented signal receiving strip configured to receive a range of frequency signal content of the signal and having a first signal receiving segment having a first frequency response, a second signal receiving segment electrically coupled to said first signal receiving segment and having a second frequency response less than the first frequency response, and a third signal coupled to the first signal receiving segment and having a third frequency response less than the first frequency response.

17 Claims, 9 Drawing Sheets

(51) Int. Cl.
*H01P 5/02* (2006.01)
*H05G 1/08* (2006.01)
*G02B 6/00* (2006.01)

(56) References Cited

U.S. PATENT DOCUMENTS

| | | | |
|---|---|---|---|
| 6,191,747 B1 | 2/2001 | Cosenza | |
| 6,420,842 B1* | 7/2002 | Gold | H02K 55/04 |
| | | | 318/141 |
| 6,956,445 B2 | 10/2005 | Coleman | |
| 6,956,450 B1* | 10/2005 | Lohr | H01P 1/067 |
| | | | 333/261 |
| 7,043,114 B2* | 5/2006 | Popescu | G02B 6/4202 |
| | | | 385/27 |
| 7,142,071 B2 | 11/2006 | Coleman | |
| 7,218,012 B1* | 5/2007 | Edenfeld | F03D 9/25 |
| | | | 290/55 |
| 7,240,251 B2* | 7/2007 | Popescu | H04L 1/24 |
| | | | 714/704 |
| 7,421,058 B2* | 9/2008 | Popescu | A61B 6/035 |
| | | | 333/24 R |
| 7,423,257 B2* | 9/2008 | Popescu | A61B 6/035 |
| | | | 250/227.14 |
| 7,515,021 B2* | 4/2009 | Kalinin | H01P 1/066 |
| | | | 333/261 |
| 7,599,445 B2* | 10/2009 | Schilling | H04L 25/0266 |
| | | | 375/296 |
| 7,663,462 B2* | 2/2010 | Makuth | H01F 38/18 |
| | | | 336/130 |
| 8,126,298 B2* | 2/2012 | Stark | G08C 17/06 |
| | | | 385/26 |
| 8,138,849 B2* | 3/2012 | West | H01P 1/068 |
| | | | 333/261 |
| 8,295,431 B2* | 10/2012 | Lindorfer | A61B 6/56 |
| | | | 378/91 |
| 8,369,780 B2* | 2/2013 | Bauer | H04B 5/00 |
| | | | 307/104 |
| 8,447,010 B2* | 5/2013 | Reichel | A61B 6/56 |
| | | | 378/19 |
| 8,594,480 B2* | 11/2013 | Krumme | A61B 6/56 |
| | | | 378/19 |
| 8,731,348 B2* | 5/2014 | Krumme | H01G 5/01 |
| | | | 378/4 |
| 9,136,912 B2* | 9/2015 | West | H01P 1/068 |
| 9,553,368 B1 | 1/2017 | Tonn | |
| 9,748,802 B2* | 8/2017 | Krumme | H02J 50/10 |
| 9,812,255 B2* | 11/2017 | Zwemmer | H01F 38/14 |
| 9,859,994 B2* | 1/2018 | Steffens | H04B 17/27 |
| 9,974,513 B2* | 5/2018 | Hannemann | A61B 6/035 |
| 10,033,074 B2 | 7/2018 | Coleman | |
| 10,093,491 B2* | 10/2018 | Tam | B65G 47/904 |
| 10,222,200 B2* | 3/2019 | Hatcher, Jr. | G01B 11/14 |
| 10,270,415 B2* | 4/2019 | Weithmann | H04B 5/0012 |
| 10,483,805 B2* | 11/2019 | Kahlman | H04B 5/0081 |
| 10,682,114 B2* | 6/2020 | Model | A61B 6/032 |
| 10,784,928 B2* | 9/2020 | Kirby | H04L 25/0266 |
| 10,984,947 B2* | 4/2021 | Grünberg | H04B 5/0037 |
| 11,129,585 B2* | 9/2021 | Model | A61B 6/035 |
| 11,349,527 B2* | 5/2022 | Kirby | H04B 5/0012 |
| 2008/0150693 A1 | 6/2008 | You et al. | |

FOREIGN PATENT DOCUMENTS

| | | | | |
|---|---|---|---|---|
| CN | 205355243 U | 6/2016 | | |
| CN | 105993095 A | 10/2016 | | |
| CN | 108140464 A | 6/2018 | | |
| EP | 3 066 715 A1 | 9/2016 | | |
| KR | 100752951 B1 | 8/2007 | | |
| WO | WO 2015/094802 | * | 6/2015 | H01P 1/06 |

OTHER PUBLICATIONS

Kai et al. (Jun. 2018) "A Novel Broadband RFID Near-Field Antenna based on TDSPSL," Communications Technology 51(6): 1463-1468.

Sivaraman et al. (2017) "Broad band PCB probes for near field measurements," 2017 International Symposium on Electromagnetic Compatibility—EMC Europe, 5 pages.

* cited by examiner

GRADUATED FREQUENCY RESPONSE NON-CONTACTING SLIP RING PROBE

TECHNICAL FIELD

The present invention relates to a slip ring probe, and more particularly to a slip ring having a segmented graduated frequency response probe.

BACKGROUND ART

Devices for conducting electrical signals between two members that are rotatable relative to one another are well known in the art. Such devices, generically known as rotary joints or rotary electrical interfaces, include slip-rings and twist capsules, inter alia. Slip-rings are typically used when unlimited rotation between the members is required, while twist capsules are typically used when only limited rotation between the members is required.

A slip ring allows the transmission of power and signals, including data, from a stationary to a rotating structure or otherwise between two structures that are rotating relative to each other. A slip ring can be used in any electromechanical system that requires rotation while transmitting power or signals. A slip ring can also improve mechanical performance, simplify system operation, and eliminate damage-prone wires dangling from movable joints. Traditionally, slip ring designs only conveyed data over a very small portion of the slip ring area.

Conventional slip-rings typically employ sliding electrical contacts between the members. These work well in certain applications, but they have inherent weaknesses that constrain electrical performance at higher frequencies. Non-contacting slip-rings are also known in the prior art. Such rotary joint systems enable the transmission of high-frequency electrical signals between a rotor and stator without sliding electrical contacts. Such non-contacting systems include devices to recover electromagnetic energy transmitted across space between a signal source and a signal receiver. In radio frequency ("RF") communications systems, such devices are called antennas (or antennae), and typically operate in the classical far-field electromagnetic radiation of free space. In contrast, rotary joints that utilize the electromagnetic near-field to effect electrical communications across very short distances and that recover energy from the electromagnetic near-field are termed "field probes," or simply "probes."

Devices intended to function in the reactive near-field of an electromagnetic source take different forms than their far-field counterparts, with magnetic loops, voltage probes, and resistively-loaded dipoles being known in the prior art. Near-field applications include RF ID tags and secure low-speed data transfer, which utilize magnetic induction in the near-field. As used herein, a "probe" is a structure that operates in the near-field of an electromagnetic source, and an "antenna" is reserved for those radiation structures that are intended to be predominantly far-field devices. The subject of the present disclosure includes electromagnetic field probes that operate in the near-field of non-contacting rotary joints such as slip rings.

Conventional antennas and near-field probes exhibit a variety of behaviors that preclude or compromise their use in non-contacting rotary joint systems when operating at greater than 1 Gbps data transmission rates. Such rotary joint systems require ultra-wideband ("UWB") frequency response to pass the necessary frequency components of multi-gigabit digital data, as well as exhibiting high return loss and low distortion impulse response to preserve the time-domain characteristics of the signal. In addition, non-contacting rotary joints exhibit characteristics that complicate the design of antennas and field probes required to capture the energy transmitted across a rotary gap. Typically, non-contacting rotary joints exhibit field strength variations with rotation between the rotor and stator, exhibit directional behavior as the signals travel as waves in transmission lines from the signal source to the transmission line terminations, and may even be discontinuous in the near-field. High-frequency non-contacting rotary joints present a unique set of challenges for the design of near-field probes.

Most prior art antennas and probes are narrowband standing-wave devices that lack both the frequency response and time-domain response to accommodate the wideband energy of multi-gigabit data streams. Small near-field voltage and current probes may exhibit reasonable frequency and impulse response, but often lack a sufficient capture area for an acceptable signal-to-noise ratio.

U.S. Pat. No. 10,033,074 discloses non-contacting rotary joints for the transmission of electrical signals across an interface defined between two relatively-movable members that addresses some of the shortcomings of prior rotary joint solutions. U.S. Pat. No. 10,033,074 discloses a non-contacting rotary joint that broadly includes a signal source operatively arranged to provide a high-speed digital data output signal, a controlled-impedance differential transmission line having a source gap and a termination gap, a power divider operatively arranged to receive the high-speed digital data output signal from the signal source, and to supply it to the source gap of the controlled-impedance differential line, a near-field probe arranged in spaced relation to the transmission line for receiving a signal transmitted across the interface, and receiving electronics operatively arranged to receive the signal received by the probe.

U.S. Pat. No. 7,142,071 discloses a velocity compensated contacting ring system that includes a first dielectric material, a plurality of concentric spaced conductive rings and a first ground plane. The first dielectric material includes a first side and a second side. The plurality of concentric spaced conductive rings are located on the first side of the first dielectric material. The conductive rings include an inner ring and an outer ring. The first ground plane is located on the second side of the first dielectric material. A width of the inner ring is greater than a width of the outer ring and the widths of the inner and outer rings are selected to substantially equalize electrical lengths of the inner and outer rings.

U.S. Pat. No. 6,956,445 discloses a contacting probe system that includes at least one flat brush contact and a printed circuit board (PCB). The PCB includes a feedline for coupling the flat brush contact to an external interface. The flat brush contact is located on a first side of the PCB and the PCB includes a plated through eyelet that interconnects the flat brush contact to the feedline.

BRIEF SUMMARY

With parenthetical reference to corresponding parts, portions or surfaces of the disclosed embodiment, merely for the purposes of illustration and not by way of limitation, a non-contacting rotary joint (115, 215) for transmission of electrical signals (30) across a non-contacting interface (60) defined between two relatively-movable members is provided, comprising: a transmitter (16) configured to transmit a signal (30) across a non-contacting interface (60); a near-field probe (18) arranged in spaced relation to the transmitter and operatively arranged to receive the signal transmitted across the interface; the near-field probe having a signal capture area (100, 200, 300) for receiving the signal transmitted across the interface; the signal capture area comprising a segmented signal receiving strip (110, 130, 210, 230, 310, 330) having a length sized for a desired low frequency signal content of the signal and configured to receive a range of frequency signal content of the signal that includes the desired low frequency signal content of the signal, the segmented signal receiving strip comprising: a first signal receiving segment (119, 219, 319) having a first frequency response; a second signal receiving segment (111A, 211A, 311A) having a second frequency response and electrically coupled to the first signal receiving segment; a third signal receiving segment (111B, 211B, 311B) having a third frequency response and electrically coupled to the first signal receiving segment; the second frequency response of the second signal receiving segment being less than the first frequency response of the first signal receiving segment; and the third frequency response of the third signal receiving segment being less than the first frequency response of the first signal receiving segment; and receiving electronics (28) operatively arranged to receive the range of frequency signal content received by the segmented signal receiving strip via the first signal receiving segment (119, 219, 319).

The first signal receiving segment may have a first length; the second signal receiving segment may have a second length greater than the first length; and the third signal receiving segment may have a third length greater than the first length. The segmented signal receiving strip may comprise: a first dissipation element (121A, 221A, 314A) positioned between the first signal receiving segment and the second signal receiving segment and configured to isolate the first signal receiving segment from the second signal receiving segment; and a second dissipation element (121B, 221B, 314B) positioned between the first signal receiving segment and the third signal receiving segment and configured to isolate the first signal receiving segment from the third signal receiving segment.

The second signal receiving segment (311A) may comprise an electrically coupled resistor (R) and capacitor (C) arranged to provide a signal filter (321A) and the third signal receiving segment (311B) may comprise an electrically coupled resistor and capacitor arranged to provide a signal filter (321B). The first signal receiving segment (319) may have a first length; the second signal receiving segment (311A) may have a second length equal to the first length; and the third signal receiving segment (311B) may have a third length equal to the first length. The segmented signal receiving strip (310) may comprise: a first dissipation element (314A) positioned between the first signal receiving segment (319) and the second signal receiving segment (311A) and configured to isolate the first signal receiving segment from the second signal receiving segment; and a second dissipation element (314B) positioned between the first signal receiving segment (319) and the third signal receiving segment (311B) and configured to isolate the first signal receiving segment from the third signal receiving segment.

The first signal receiving segment, the second signal receiving element and the third signal receiving element may each comprise copper. The first dissipation element and the second dissipation element may each comprise a resistor. The first signal receiving segment (119, 219, 319) may comprise a center tap (61) communicating with the receiving electronics (28).

The first frequency response of the first signal receiving segment may correspond to a first frequency subrange of the range of frequency signal content of the signal; and the second frequency response of the second signal receiving segment may correspond to a second frequency subrange of the range of frequency signal content of the signal; and the first frequency subrange may be greater than the second frequency subrange.

The signal transmitted across the non-contacting interface by the transmitter may be a high-speed digital data output signal. The transmitter may comprise a signal source (20) operatively arranged to provide a high speed digital data output signal, a controlled-impedance differential transmission line (162) having a source gap (23) and a termination gap (24), a power divider (21) operatively arranged to receive the high-speed digital data output signal from the signal source, and to supply the high-speed digital data output signal from the signal source to the source gap of the controlled-impedance differential transmission line; and the near-field probe may be arranged in spaced relation to the controlled-impedance differential transmission line and may be operatively arranged to receive the signal transmitted across the non-contacting interface by the transmitter.

The segmented signal receiving strip may comprise at least two additional signal receiving segments (112A, 112B, 113A, 113B, 311), with each of the additional signal receiving segments having a frequency response and being electrically coupled to the first signal receiving segment; and wherein the frequency response of each additional signal receiving segment decreases the further the additional signal receiving segment is from the first signal receiving segment. The segmented signal receiving strip may comprise at least one dissipation element (121A, 122A, 123A, 121B, 122B, 123B, 221A, 222A, 223A, 221B, 222B, 223B, 314A, 314B, 314) positioned between each of the second signal receiving segment, the third signal receiving segment, and the additional signal receiving segments, and the dissipation elements may be configured to isolate the respective signal receiving segments from each other.

The length of each additional signal receiving segment (112A, 112B, 113A, 113B) may increase the further the additional signal receiving segment is from the first signal receiving segment (119, 219). The second signal receiving segment (311A), the third signal receiving segment (311B), and the additional signal receiving segments (311) may comprise an electrically coupled resistor (R) and capacitor (C) arranged to provide a signal filter (321).

The signal capture area may comprise a second segmented signal receiving strip (130, 230, 330) orientated parallel to the first segmented signal receiving strip (110, 210, 310); the second segmented signal receiving strip comprising: a first signal receiving segment (139, 239, 339) having a first frequency response; a second signal receiving segment (131A, 231A, 331A) having a second frequency response and electrically coupled to the first signal receiving segment; a third signal receiving segment (131B, 231B, 331B) having a third frequency response and electrically coupled to the first signal receiving segment; the second frequency response of the second signal receiving segment being less than the first frequency response of the first signal receiving segment; and the third frequency response of the third signal receiving segment being less than the first frequency response of the first signal receiving segment, and the receiving electronics (28) may be operatively arranged to receive signal content received by the second segmented signal receiving strip (130, 230, 330) via the first signal receiving segment (139, 239, 339) of the second segmented signal receiving strip (130, 230, 330).

In another aspect, a probe is provided having a length sized for a desired low frequency signal content, the probe comprising: a plurality of signal receiving strips (110, 130, 210, 230, 310, 330) configured to receive low and high frequency signal content, each of the plurality of signal receiving strips comprising: a center tap (61, 62, 119, 139, 219, 239, 319, 339) connected to a processor (28); a first signal receiving segment (111A, 211A, 311A) including a length for receiving a high frequency signal; a second signal receiving segment (111B, 211B, 311B) including a length for receiving the high frequency signal; a first dissipation element (121A, 221A, 314A) positioned between the center tap and the first signal receiving segment to isolate the center tap and the first signal receiving segment; and a second dissipation element (121B, 221B, 314B) positioned between the center tap and the second signal receiving segment to isolate the center tap and the second signal receiving segment.

The plurality of signal receiving strips may further comprise: at least one first additional signal receiving segment (112A, 113A, 212A, 213A) including a length for receiving the high frequency signal, the at least one first additional signal receiving segment being electrically coupled to the first signal receiving segment; and at least one second additional signal receiving segment (112B, 113B, 212B, 213B) including a length for receiving the high frequency signal, the at least one second additional signal receiving segment being electrically coupled to the second signal receiving segment. The plurality of signal receiving strips may further comprise a plurality of dissipation elements (122A, 123A, 222A, 223A) positioned between the signal receiving segments to isolate the center tap and the signal receiving segments. The length of each respective signal receiving segment (112A, 113A, 212A, 213A, 112B, 113B, 212B, 213B) may increase the further the signal receiving segment is from the center tap. Each of the signal receiving segments may correspond to a range of frequency signal content. The first signal receiving segment and the second signal receiving segment may comprise copper conductive material. The first signal receiving segment (311A) and the second signal receiving segment (311B) may be electrically coupled to a resistor (R) and a capacitor (C) filter (321). The first signal receiving segment and the second receiving segment may be 0.11 inches by 0.075 inches.

In another aspect, a method of receiving low and high frequency signal content is provided, the method comprising: providing a probe including a length sized for a desired low frequency signal content, the probe comprising: a plurality of signal receiving strips configured to receive low and high frequency signal content, each of the plurality of signal receiving strips comprising: a center tap connected to a processor; a first signal receiving segment including a length for receiving a high frequency signal; a second signal receiving segment including a length for receiving the high frequency signal; a first dissipation element positioned between the center tap and the first signal receiving segment to isolate the center tap and the first signal receiving segment; and a second dissipation element positioned between the center tap and the second signal receiving segment to isolate the center tap and the second signal receiving segment; and receiving, by the first signal receiving segment and the second signal receiving segment, the low and high frequency signal content.

Each of the plurality of signal receiving strips may further comprise: at least one first additional signal receiving segment including a length for receiving the high frequency signal, the at least one first additional signal receiving segment being electrically coupled to the first signal receiving segment; and at least one second additional signal receiving segment including a length for receiving the high frequency signal, the at least one second additional signal receiving segment being electrically coupled to the second signal receiving segment. Each of the plurality of signal receiving strips may further comprise a plurality of dissipation elements positioned between the signal receiving segments to isolate the center tap and the signal receiving segments. The length of each respective signal receiving segment may increase the further the signal receiving segment is from the center tap. Each of the signal receiving segments may correspond to a range of frequency signal content. The first signal receiving segment and the second signal receiving segment may be made of a copper conductive material. The first signal receiving segment and the second signal receiving segment may be electrically coupled to a resistor and a capacitor. The first signal receiving segment and the second receiving segment may be 0.11 inches by 0.075 inches.

In another aspect, a slip ring probe (100, 200, 300) is provided comprising a plurality of conductive strips (110, 120, 210, 230, 310, 330) arranged in spaced relation to a transmitter (162) of a slip ring (115, 215) for receiving a signal (30) transmitted across an interface (60) of the slip ring (115, 215), each of the plurality of conductive strips (110, 120, 210, 230, 310, 330) having a center-tap (61, 62, 113, 123, 219, 239, 319, 330) and a length (132, 252) capable of providing a coupling capacitance across the whole length of the plurality of conductive strips (110, 120, 210, 230, 310, 330) between the transmitter (162) and the probe (100, 200, 300) of the slip ring (115, 215).

The probe may be a graduated frequency response probe (100, 200, 300). Each of the plurality of conductive strips (110, 120, 210, 230, 310, 330) may comprise a variable loss tangent (131, 251) across the respective lengths (132, 252) of each of the plurality of conductive strips (110, 120, 210, 230, 310, 330). The variable loss tangent (131, 251) across the respective lengths (132, 252) of each of the plurality of conductive strips (110, 120, 210, 230, 310, 330) may increase towards outer regions of the plurality of conductive strips (110, 120, 210, 230, 310, 330). The variable loss tangent (131, 251) may be minimal at the center-tap (61, 62, 113, 123, 219, 239, 319, 339) of each of the plurality of conductive strips (110, 120, 210, 230, 310, 330). The respective lengths (132, 252) of each of the plurality of conductive strips (110, 120, 210, 230, 310, 330) may be selected based on a frequency of the signal (30). Each of the plurality of conductive strips (110, 120, 210, 230, 310, 330) may comprise a signal capture area. The signal capture area may correspond to a coupling capacitance, the larger the signal capture area the larger the coupling capacitance. Each of the plurality of conductive strips (110, 120, 210, 230) may comprise a plurality of discontinuous attenuation filters (111A, 111B, 112A, 112B, 113A, 113B, 211A, 211B, 212A, 212B, 213A, 213B). Lengths of each of the plurality of discontinuous attenuation filters may increase away from the center-tap (61, 62, 113, 123, 219, 239) of the probe (100, 200). Lengths of each of the plurality of discontinuous attenuation filters (111A, 111B, 112A, 112B, 113A, 113B, 211A, 211B, 212A, 212B, 213A, 213B) may correspond to a frequency bandwidth. The probe (100, 200, 300) may comprise resistors (121A, 122A, 123A, 121B, 122B, 123B, 221A, 222A, 223A, 221B, 222B, 223B, 314A, 314B, 314) arranged between adjacent attenuation filters of the plurality of discontinuous attenuation filters. The probe (100, 200)

may further comprise pads (115A, 115B, 135A, 135B, 215A, 215B, 235A, 235B) at ends of each of the plurality of conductive strips (110, 120, 210, 230) to attenuate frequencies. The probe (100, 200, 300) may be a straight probe or a curved probe. The length (132, 252) of the plurality of conductive strips (110, 120, 210, 230) may be proportional to a wavelength of the electrical signals (30) across the interface (60) of the slip ring (115, 215), wherein a lower frequency of the signal (30) corresponds to a longer length of the plurality of conductive strips (110, 120, 210, 230) to increase a coupling capacitance of the probe (100, 200). The receiver may be configured to receive low frequencies of the signal across a majority of the length (132, 252) of the plurality of conductive strips (110, 120, 210, 230, 310, 330) and high frequencies in an area proximate to the center-tap (113, 123, 219, 239, 319, 339) of the plurality of conductive strips (110, 120, 210, 230, 310, 330).

DETAILED DESCRIPTION OF THE EMBODIMENTS

Figure 1:
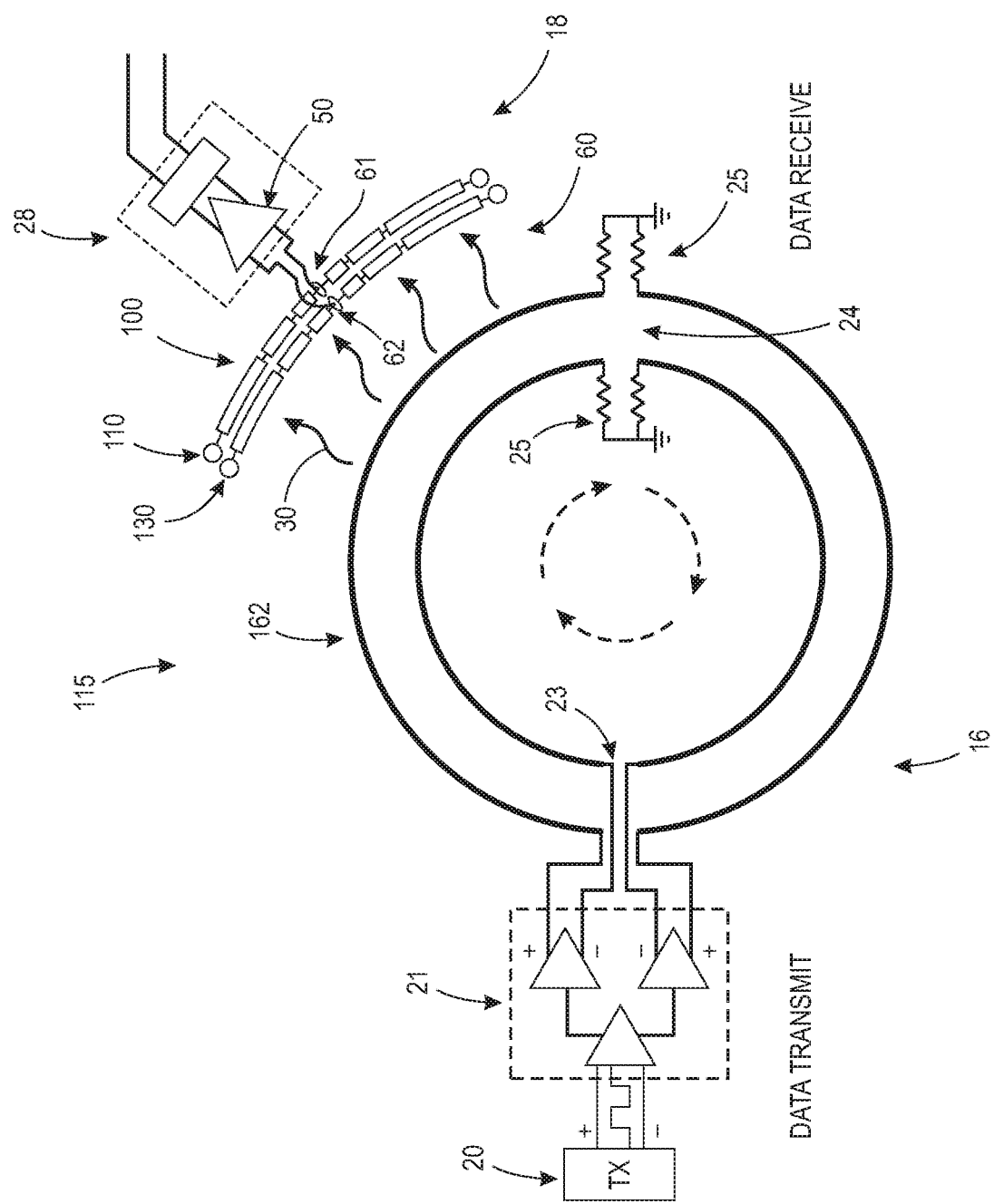
FIG. 1 is a schematic view of a first embodiment of an improved non-contacting rotary joint, and in particular shows a non-contacting rotary joint ("NCRJ") system diagram for transmission of a transmitter (TX) signal from a DATA TRANSMIT side to a DATA RECEIVE side. Conventional positive (+) and negative (−) symbols are shown to denote differential signaling and transmission lines.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Non-contact slip ring probe structures used for data transfer respond differently at different data rates. Probes designed to perform at a particular data transfer rate and protocol do not perform well for other data rates and protocols. Additionally, even optimized probes present waveform distortion as the probe moves along a rotary or linear data source track, and especially at locations where the tracks are discontinuous. This results in reduced received signal quality at a detector and an increase in signal (bit) error rates (BER).

Referring now to the drawings, and more particularly to FIGS. 1-4 thereof, a slip ring is provided, of which a first embodiment is generally indicated at 115. Slip ring 115 is a non-contacting rotary joint for the transmission of high-speed data signals across an intervening interface between two relatively movable members, without the use of sliding electrical contacts in the signal path. The joint includes a split differential microstrip transmission line driven by a signal source through a power divider and resistively terminated at a far end, and a receiver that includes a planar differential field probe that senses the near-field of the transmitter differential microstrip and that delivers recovered signal energy to an electronic receiver for detection. This high-speed non-contacting rotary joint may be implemented with printed circuit board ("PCB") technology, and may support multi-gigabit data transmission rates, with frequency-domain bandwidths.

As shown in FIG. 1, signal source 20 serves to deliver a high-speed digital data signal to power divider 21 (which can be active or passive), where the signal transits through source gap 23 and into controlled-impedance differential transmission line 162. The signal then propagates as a transverse electromagnetic wave ("TEM") on the differential transmission line ring structure of line 162 of transmitter circuit board 16 to where the signal is terminated at far-end termination gap 24 by wideband termination techniques 25. The TEM signal traveling on ring transmission line 162 is sampled in the near-field by ultra-wideband planar segmented GFR near-field probe signal capture area 100 of receiver circuit board 18, which is suspended at some distance over transmitter 16 and ring structure 162 to allow free rotation of the rotary joint, without physical contact. Thus, as shown, probe signal capture area 100 is suspended at a distance over controlled-impedance differential transmission line 162. The signal 30 recovered across air gap 60 by near-field probe 100 is delivered to receiver electronics 28 of receiver 18, where the signal can be detected, amplified, and its data recovered.

Data source driver 20 may be any of a number of technologies capable of the desired data rate, including a current-mode logic ("CML"), a field-programmable gate array ("FPGA"), a low-voltage differential signaling ("LVDS") device, and other discrete devices. The data signal is divided into two equal-amplitude phase-inverted signals for feeding the differential ring system, a function that can be done by passive resistive dividers or by active techniques (e.g., CML fan-out buffer). Power divider 21 can be implemented as a discrete assembly or, as in this embodiment, incorporated onto PCB structures of transmitter 16 with discrete or integrated components, or embedded passive components implemented in planar PCB geometry. The technology employed to implement the power divider imposes a constraint to high frequency operation of the data channel due to parasitic reactances of the component package introducing signal reflections that become progressively more pronounced at higher frequencies. The driving electronics, power divider, and transmission line terminations can be implemented using a variety of technologies (e.g., thru-hole or surface mount components on PCB structures, integrated components, or embedded passive components implemented in planar PCB geometry), with high frequency performance capabilities determined by decreasing parasitic reactances.

The ring structure 162 of transmitter 16 in non-contacting rotary joint 115 is a controlled-impedance differential transmission line that is non-resonant, discontinuous, and typically implemented in microstrip multilayer printed circuit board technology. The nature of ring transmission line 162 is such that the bulk of the signal energy is contained in the near-field of the conductors. Energy radiated from the structure tends to cancel in the far-field, an aid to electromagnetic interference (EMI) suppression. The propagating signal on the ring system has directional properties, Near-field probe 100 of receiver 18 is designed to have an ultra-wideband near-field response, while meeting the specific requirements of the high-speed data transmission on ring transmission lines 162. Receiver 18 is shown as broadly including a PCB having on one side multiple pairs of parallel segmented conductive strips 100. Each pair of segmented conductive strips 100 comprises first segmented conductive strip 110 and second segmented conductive strip 130. First conductive strip 110 and second conductive strip 130 each have a length corresponding to the desired low frequency domain of the receiver and are configured to receive signals from transmitter 160 across air gap 60 of rotary joint 115.

First conductive strip 110 comprises center conductive pad 119, conductive pads 111A, 112A and 113A extending towards end 116 from center pad 119, end capacitive element 115A defining end 116, conductive pads 111B, 112B and 113B extending towards end 118 from center pad 119, and end capacitive element 115B defining end 118. Center conductive pad 119 has a center via or tap 61 connecting to the first stage amplifier of signal receiving electronics 28 of receiver board 18. Each of center conductive pad 119, conductive pads 111A, 112A and 113A, end capacitive element 115A, conductive pads 111B, 112B and 113B, and end capacitive element 115B are separated from each other by resistors 121A, 121B, 122A, 122B, 123A, 123B, 124A and 124B, respectively.

Similarly, second conductive strip 130 extends from first end 136 to second end 138. Second conductive strip 130 comprises center conductive pad 139, conductive pads 131A, 132A and 133A extending towards end 136 from center pad 139, end capacitive element 135A defining end 136, conductive pads 131B, 132B and 133B extending towards end 138 from center pad 139, and end capacitive element 135B defining end 138. Center conductive pad 139 has a center via or tap 62 connecting to the first stage amplifier of signal receiving electronics 28 of receiver board 18. Each of center conductive pad 139, conductive pads 131A, 132A and 133A, end capacitive element 135A, conductive pads 131B, 132B and 133B, and end capacitive element 135B are separated from each other by resistors 141A, 141B, 142A, 142B, 143A, 143B, 144A and 144B, respectively.

Figure 4:
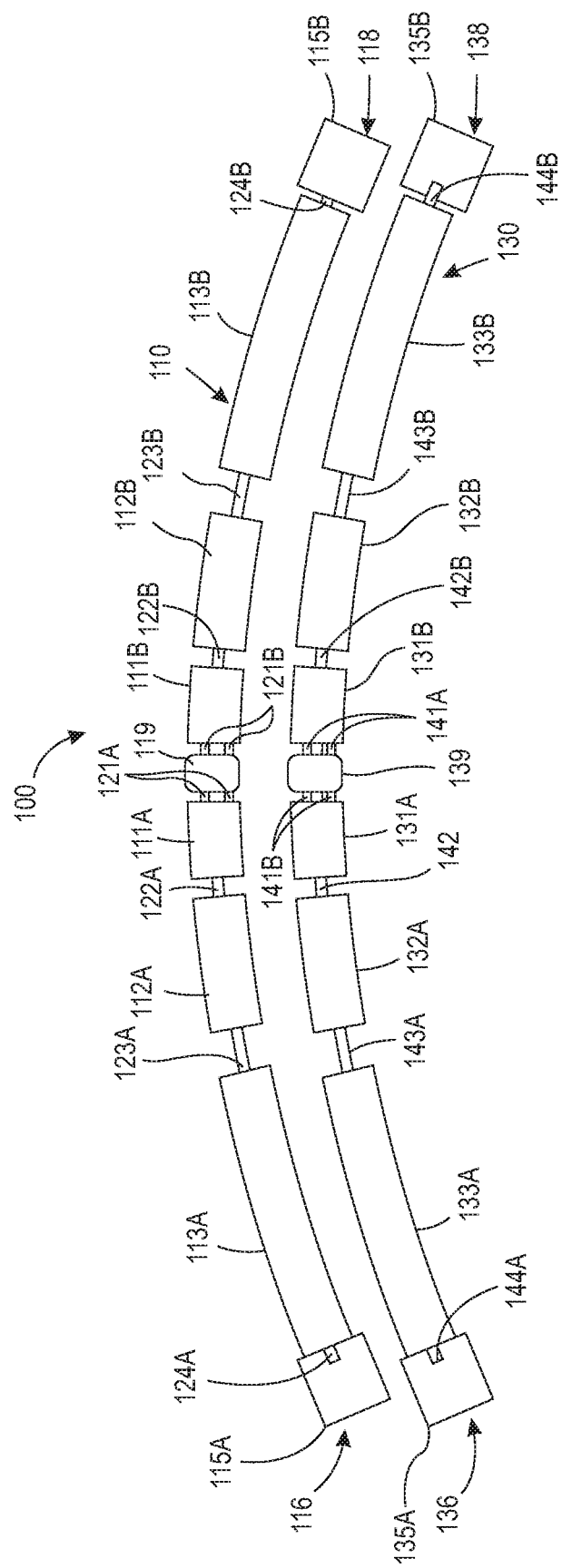
FIG. 4 is an enlarged top plan view of a pair of the conductive strips of the probe shown in FIG. 3.

Thus, first conductive strip 110 of probe 100 is not continuous and instead is formed from a plurality of segments 119, 111A, 111B, 112A, 112B, 113A and 113B, a plurality of resistors 121A, 121B, 122A, 122B, 123A, 123B, 124A and 124B, a first capacitive end 115A, and a second capacitive end 115B. As shown in FIG. 4 and as further described below with respect to embodiment 200, in this embodiment segments 111A and 111B, 112A and 112B, and 113A and 113B, vary in length, with the segment length increasing with the increase in distance from center segment 119 and center via 61. Thus, center segment 119 has a center length, segments 111A and 111B have a first length greater than the center length of center segment 119, segments 112A and 112B have a second length greater than the first length of segments 111A and 111B, and segments 113A and 113B have a third length greater than the second length of segments 112A and 112B. Because of this difference in length, conductive segments 111A and 111B, 112A and 112B, and 113A and 113B have different frequency responses as a function of their position relative to center segment 119. Such conductive segments have a frequency response that decreases as a function of their distance from or location relative to center segment, such that segments 113A and 113B have the lowest response to high frequency signal components, and center segment 119 has the highest response to high frequency signal components. The overall strip length, individual segment lengths, and the number of segments of conductive strip 110 may be varied depending on the frequency range desired for receiver 18.

As shown in FIG. 4 and as further described below with respect to embodiment 200, in this embodiment resistors 121A, 121B, 122A, 122B, 123A, 123B, 124A and 124B also vary in length, with the resistor length increasing with the increase in distance from center tab 119 and center via 62. Thus, resistors 121A and 121B between center segment 119 and segments 111A and 111B, respectively, have a first length, resistors 122A and 122B between segments 111A and 111B and segments 112A and 112B, respectively, have a second length greater than the first length of resistors 121A and 121B, and resistors 123A and 123B between segments 112A and 112B and segments 113A and 113B, respectively, have a third length greater than the second length of resistors 122A and 122B. Resistors 124A and 124B between segments 113A and 113B and the small end capacitance of ends 115A and 115B, respectively, help dissipate high frequency signal components propagated towards ends 116 and 118 of conductive strip 110. Resistors 121A, 121B, 122A, 122B, 123A, and 123B are configured to have values that are set to attenuate the frequencies of interest at their locations along strip 110. In this embodiment, resistors 123A and 123B are configured such that low frequency signal components can pass from conductive segments 113A and 113B to conductive segments 112A and 112B, respectively, while higher frequency signal components do not. In turn, dual resistors 122A and 122B are configured such that medium high frequency signal components can pass from conductive segments 112A and 112B to conductive segments 111A and 111B, respectively, while higher frequency signal components do not. In turn, resistors 121A and 121B are configured such that medium frequency signal components can pass from conductive segments 111A and 111B to conductive segment 119, respectively, while higher frequency signal components do not. The resistor values, individual resistor lengths, and the number of resistors may be varied depending on the frequency range and attenuation desired for receiver 18.

Similarly, second conductive strip 130 of probe 100 is not continuous and instead is formed from a plurality of segments 139, 131A, 131B, 132A, 132B, 133A and 133B, a plurality of resistors 141A, 141B, 142A, 142B, 143A, 143B, 144A and 144B, a first capacitive end 135A, and a second capacitive end 135B. As shown in FIG. 4 and as further described below with respect to embodiment 200, in this embodiment segments 131A and 131B, 132A and 132B, and 133A and 133B, vary in length, with the segment length increasing with the increase in distance from center segment 139 and center via 62. Thus, center segment 139 has a center length, segments 131A and 131B have a first length greater than the center length of center segment 139, segments 132A and 132B have a second length greater than the first length of segments 131A and 131B, and segments 133A and 133B have a third length greater than the second length of segments 132A and 132B. Because of this difference in length, conductive segments 131A and 131B, 132A and 132B, and 133A and 133B have different frequency responses as a function of their position relative to center segment 139. Such conductive segments have a frequency response that decreases as a function of their distance from or location relative to center segment, such that segments 133A and 133B have the lowest response to high frequency signal components, and center segment 139 has the highest response to high frequency signal components. The overall strip length, individual segment lengths, and the number of segments of conductive strip 130 may be varied depending on the frequency range desired for receiver 18.

As shown in FIG. 4 and as further described below with respect to embodiment 200, in this embodiment resistors 141A, 141B, 142A, 142B, 143A, 143B, 144A and 144B also vary in length, with the resistor length increasing with the increase in distance from center segment 139 and center via 62. Thus, resistors 141 and 141B between center segment 139 and segments 131A and 131B, respectively, have a first length, resistors 142A and 142B between segments 131A and 131B and segments 132A and 132B, respectively, have a second length greater than the first length of resistors 141A and 141B, and resistors 143A and 143B between segments 132A and 132B and segments 133A and 133B, respectively, have a third length greater than the second length of resistors 142A and 142B. Resistors 144A and 144B between segments 133A and 133B and the small end capacitance of ends 135A and 135B, respectively, help dissipate high frequency signal components propagated towards ends 136 and 138 of conductive strip 130. Resistors 141A, 141B, 142A, 142B, 143A, and 143B are configured to have values that are set to attenuate the frequencies of interest at their locations along strip 130. In this embodiment, resistors 143A and 143B are configured such that low frequency signal components can pass from conductive segments 133A and 133B to conductive segments 132A and 132B, respectively, while higher frequency signal components do not. In turn, dual resistors 142A and 142B are configured such that medium high frequency signal components can pass from conductive segments 132A and 132B to conductive segments 131A and 131B, respectively, while higher frequency signal components do not. In turn, resistors 141A and 141B are configured such that medium frequency signal components can pass from conductive segments 131A and 131B to conductive segment 139, respectively, while higher frequency signal components do not. The resistor values, individual resistor lengths, and the number of resistors may be varied depending on the frequency range and attenuation desired for receiver 18

Thus, slip ring 115 comprises a longer transmit strip 162 of PCB material and a shorter differential conductive receiver probe signal capture area 100. The transmit strip and the receiver probe 100 are placed in proximity and signals placed on transmit strip 162 are typically capacitively coupled across air gap 60 to receiver probe 100. The signals are amplified by first stage amplifier 50 and sent to communication receiver circuit 28 Traces are typically organized as differential tracks to reduce EMC effects, but single tracks are envisioned as well.

Figure 2:
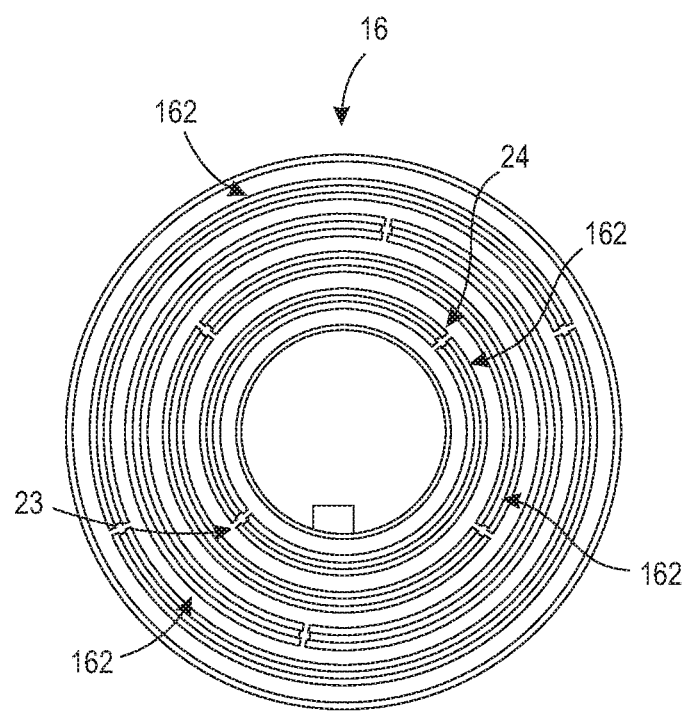
FIG. 2 is a top plan view of the circular platter circuit board transmitter of the slip ring shown in FIG. 1, with transmit tracks in a circular configuration.
Figure 3:
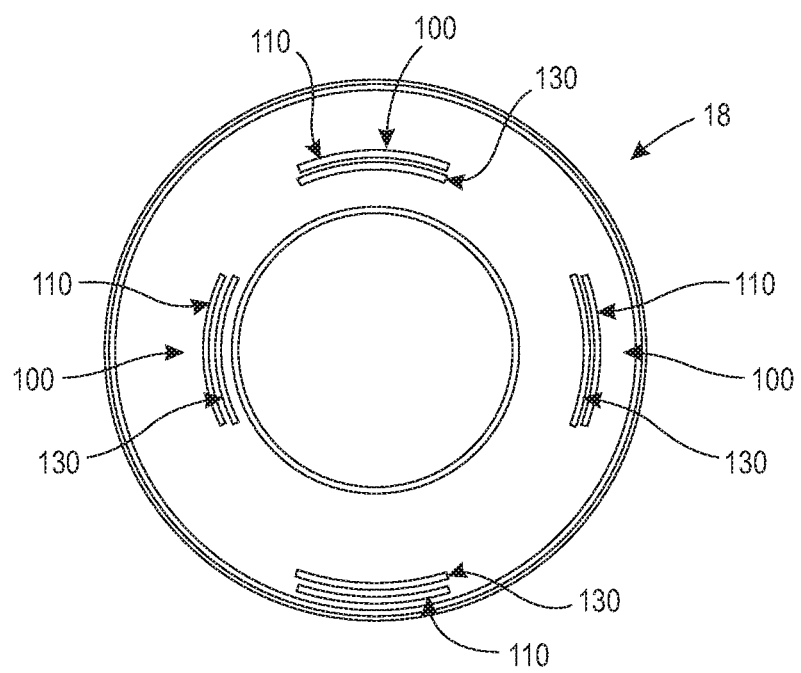
FIG. 3 is a top plan view of the circular platter circuit board receiver and probe of the slip ring shown in FIG. 1, with conductive strips in a circular-curved platter configuration.

As shown in FIG. 2, transmitter 16 has a circular flat platter configuration with 4 channels 162 orientated about a center. As shown in FIG. 3, receiver 18 is likewise configured as a circular platter circuit board having four probe channels 100 with curved conductive strips 110, 130 orientated about a center. Transmitter 16 and receiver 118 are coaxial such that the receive probe 100 for each channel is radially aligned across air gap 60 from the corresponding channel transmit tracks 162 of slip ring 115. Signals that propagate about the transmit tracks 162 are capacitively coupled across air gap 60 to the receive probe 100, where the signals are amplified and conveyed to the communication receiver circuit.

Figure 5:
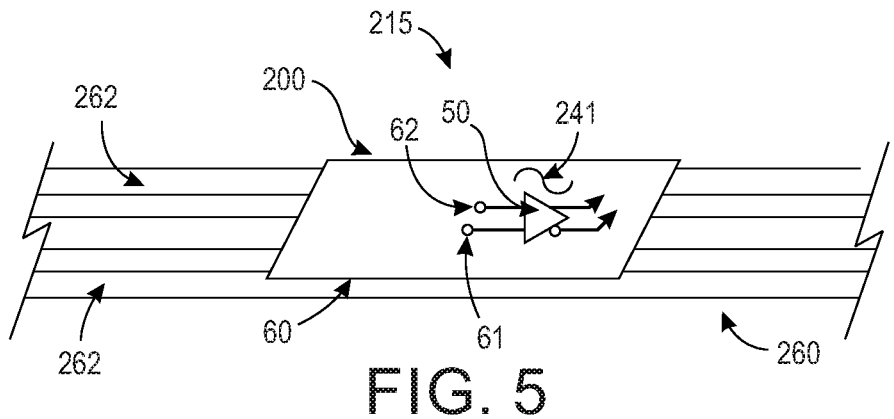
FIG. 5 is a perspective view of a second embodiment of a non-contact slip ring transmitter and receiver, with transmit tracks and conductive strips in a linear configuration.
Figure 6:
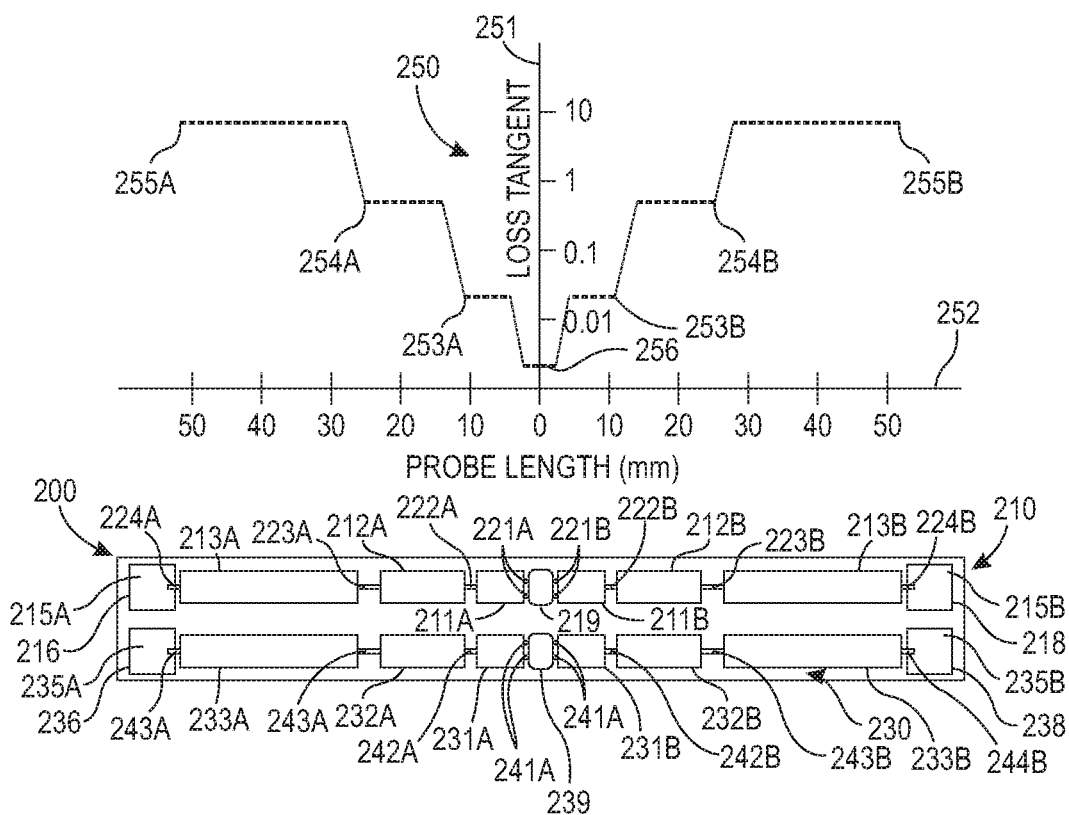
FIG. 6 is an enlarged plan view of the conductive strips of the probe shown in FIG. 5, with a corresponding loss tangent graph.

While transmit tracks 162 and receiver probe 100 are curved on circular platters (as shown in FIG. 1-4), in the alternative embodiment 200 shown in FIGS. 5 and 6, such transmit tracks and receiver probe are constructed as straight parallel tracks. Referring now to FIGS. 5 and 6, a second embodiment of an improved slip ring probe is generally indicated at 200. Other than its straight configuration, probe 200 is similar in construction and operation as curved probe 100.

As shown in FIG. 5, slip ring 215 has a longer transmit strip of PCB material 260 and a shorter differential conductive receiver probe 200. The transmit strip 260 and receiver probe 200 are placed in proximity and signals placed on the transmit strip are typically capacitively coupled across air gap 60 to receiver probe 200. Thus, receive probe 200 is placed above or adjacent to transmit tracks 262 of slip ring 215 as shown in FIG. 5. Signals that propagate down transmit tracks 262 are capacitively coupled across air gap 60 to receive probe 200, where the signals are amplified via amplifier 50 and conveyed to the communication receiver circuit.

As shown in FIG. 6, probe 200 is shown as broadly including first conductive strip 210 and a second conductive strip 230. First conductive strip 210 of the slip ring 200 includes a plurality of segments 219, 211A, 211B, 212A, 212B, 213A and 213B, a plurality of resistors 221A, 221B, 222A, 222B, 223A, 223B, and 224A, a first end 215A, and a second end 215B. The plurality of segments 219, 211A, 211B, 212A, 212B, 213A and 213B vary in length as shown in FIG. 6 and in the same manner as described about with respect to probe 100. Segments 211A and 211B, 212A and 212B, and 213A and 213B increase in length from center segment 219 to first end 215A and the second end 215B, respectively, of first conductive strip 210.

The first end 215A and second end 215B of first conductive strip 210 each include a first copper pad over a second copper pad that form a small capacitance to ground in series with adjacent resistors 224A and 224B, respectively, which is designed to attenuate the frequencies of interest at that particular location. These pads are shown as square having a width larger than the width of the plurality of segments 219, 211A, 211B, 212A, 212B, 213A and 213B. However, other shapes and widths, including with respect to the plurality of segments 219, 211A, 211B, 212A, 212B, 213A and 213B, are contemplated as suitable for the intended purpose as would be understood by a person of ordinary skill in the art.

Again, the plurality of resistors 221A, 221B, 222A, 222B, 223A, 223B, 224A and 224B are configured to be positioned between adjacent segments of the plurality of segments 219, 211A, 211B, 212A, 212B, 213A and 213B, and end pads 215A and 215B of slip ring probe 200. The value of the plurality of resistors of first conductive strip 210 are selected to attenuate the frequencies of interest at a particular location. This embodiment also includes two resistors between center segment 219 and adjacent segments 211A and 211B of the plurality of segments, but only one resistor or more than two resistors is contemplated by this disclosure. Furthermore, the length of the plurality of resistors varies depending on the size of the adjacent segments of the plurality of segments of first conductive strip 210.

Second conductive strip 220 of the slip ring 200 includes a plurality of segments 239, 231A, 231B, 232A, 232B, 233A and 233B, a plurality of resistors 241A, 241B, 242A, 242B, 243A, 243B, and 244A, a first end 235A, and a second end 235B. The plurality of segments 239, 231A, 231B, 232A, 232B, 233A and 233B vary in length as shown in FIG. 6 and in the same manner as described about with respect to probe 100. Segments 231A and 231B, 232A and 232B, and 233A and 234B increase in length from center segment 239 to first end 235A and the second end 235B, respectively, of second conductive strip 230.

The first end 235A and second end 235B of first conductive strip 230 each include a first copper pad over a second copper pad that form a small capacitance to ground in series with adjacent resistors 244A and 244B, respectively, which is designed to attenuate the frequencies of interest at that particular location. These pads are shown as square having a width larger than the width of the plurality of segments 239, 231A, 231B, 232A, 232B, 233A and 233B. However, other shapes and widths, including with respect to the plurality of segments 239, 231A, 231B, 232A, 232B, 233A and 233B, are contemplated as suitable for their intended purpose as would be understood by a person of ordinary skill in the art.

Again, the plurality of resistors 241A, 241B, 242A, 242B, 243A, 243B, 244A and 244B are configured to be positioned between adjacent segments of the plurality of segments 239, 231A, 231B, 232A, 232B, 233A and 233B, and end pads 235A and 235B of slip ring probe 200. The value of the plurality of resistors of second conductive strip 230 is selected to attenuate the frequencies of interest at a particular location. This embodiment also includes two resistors between center segment 219 and adjacent segments 231A and 231B of the plurality of segments, but only one resistor or more than two resistors is contemplated by this disclosure. Furthermore, the length of the plurality of resistors varies depending on the size of the adjacent segments of the plurality of segments of second conductive strip 230.

The outer extremities of slip ring probe 200 (e.g., the first end 215A and the second end 215B of the first conductive strip 210 and the first end 235A and the second end 235B of the second conductive strip 230) have greater high-frequency loss. The center portion of slip ring probe 200, nearest center segment 219 and center segment 239 and center via 61 and center via 62 of strips 210 and 230, respectively, has almost no loss at high frequencies. This keeps the highest frequencies feeding amplifier 50 adjacent center via 61 and via 62 of segments 219 and 239 of the slip ring probe 200, respectively, constraining wavelengths (frequencies) to a length of conductive material (e.g., the plurality of segments of the first conductive strip 210 and the plurality of segments of the second conductive strip 230) short enough so as to not form a transmission line.

As frequencies of interest decrease, and wavelengths increase, longer and longer lengths of the first conductive strip 210 and second conductive strip 230 of slip ring probe 200 are utilized. This greater signal capture area of slip ring probe 200 used at lower frequencies increases the coupling capacitance to the transmit traces 262. This is beneficial because higher frequencies couple well with smaller capacitances. To achieve the same coupling at lower frequencies, a larger capacitance is required (assuming impedances are flat across the slip ring probe 200).

The first conductive strip 210 and the second conductive strip 230 of the slip ring probe 200 may be formed of PCB copper strips or any other conductive material suitable for the intended purpose and understood by a person of ordinary skill in the art. In this embodiment, the plurality of segments 219, 211A, 211B, 212A, 212B, 213A and 213B of first conductive strip 210 and the plurality of segments 239, 231A, 231B, 232A, 232B, 233A and 233B of second conductive strip 230 are copper tabs whose length corresponds to frequency bandwidths and desired frequency response at that location of the slip ring probe 200 as shown in FIG. 6. FIG. 6 illustrates a loss tangent graph 250 with a loss tangent axis 251 and a probe length axis 252. FIG. 6 further illustrates the various degrading frequency responses 253A, 253B, 254A, 254B, 255A and 255B along the length of slip ring probe 200. For example, segments 211A and 231A of first conductive strip 210 and second conductive strip 230, respectively, correspond to loss tangent values 253A and 253B, respectively. Segments 212A and 232A of first conductive strip 210 and second conductive strip 230, respectively, correspond to loss tangent values 254A and 254B, respectively. Segments 213A and 233A of first conductive strip 210 and second conductive strip 230, respectively, correspond to loss tangent values 255A and 255B, respectively. Segments 219 and 239 of first conductive strip 210 and second conductive strip 230, respectively, correspond to loss tangent value 256.

Figure 11A:
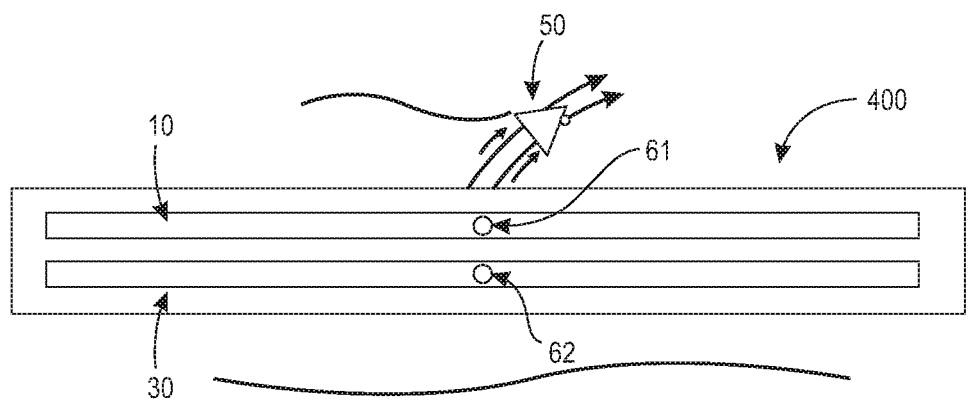
FIGS. 11A and 11B illustrate signal conveyance of the probe for low frequency content and high frequency content, respectively.
Figure 11B:
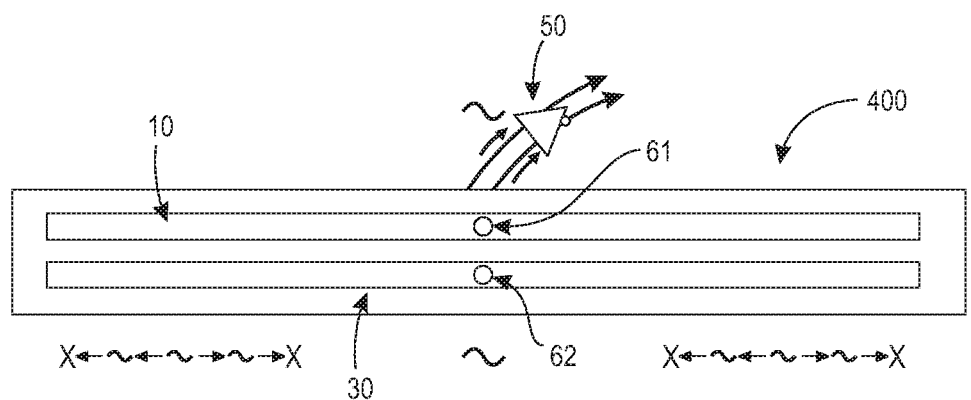

As illustrated in FIG. 11A, at low frequencies, slip ring probe 200 uses a majority of the length of the first conductive strip 210 and the second conductive strip 230 to convey information to amplifier 50. As illustrated in FIG. 11B, at higher frequencies, center receiver segments 119 and 139, as well as other subject interior conductive segments, such as segments 211A, 211B and 231A, 231B for example, of first conductive strip 210 and second conductive strip 230 of slip ring probe 200 convey signals to amplifier 50. Higher frequencies towards first ends 215A and 235A and second ends 215B and 235B of first conductive strip 210 and second conductive strip 230 are dissipated and absorbed as heat. As such, there is no opportunity of propagation to the amplifier pickup area 50.

Figure 7:
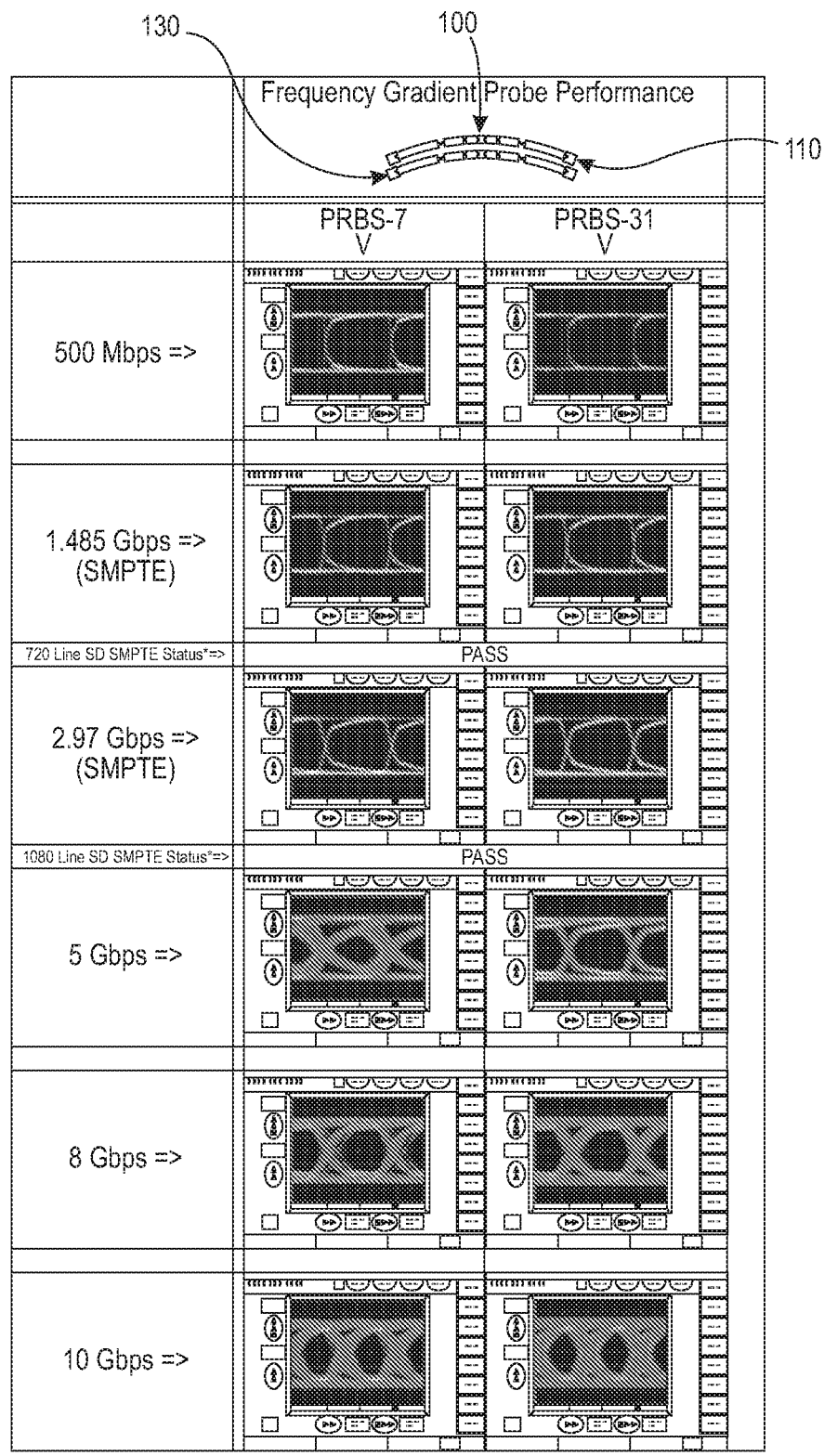
FIG. 7 is a view of received eye diagrams for the slip ring probe of FIG. 4 at different frequencies.

Referring to FIG. 7, various eye diagrams of bit sequences PRBS-7 and PRBS-31 are illustrated for slip ring probe 100. The test results of slip ring probe 100 correspond to low-end frequency content in a frequency range between 500 Mbps and 10 Gbps.

There may be locations across transmit track 262 of the slip ring where the signal performs well, while at other locations along transmit track 262 the signal breaks down. These fluctuations are dependent on the base transmit frequency and resonant structures created as the receive probe 200 changes position relative to transmit tracks 262 of the slip ring, including positions where the tracks are discontinuous (e.g., over air gap 60).

For example, to convey a signal such as an HD video signal across a slip ring communications channel, a flat channel bandwidth between 33.7 MHz and 8910 MHz is utilized, all without permutations to sinewave amplitudes or phase. These frequencies also correspond to waveform period lengths of roughly 25 mm to 7 meters (estimated at 75% of the speed of light in actual PCB material). These wavelengths are conveyed to the receiver probe 200 via capacitive and/or inductive coupling simultaneously.

The longer wavelengths (lower frequencies) impinge energy into the receiving probe 200 capacitively, with no transmission line effects (e.g., electromagnetic interference and noise). This is because the lower frequency wavelengths are much greater than the length of the probe 200, and the probe 200 responds continuously along its length at these frequencies. These lower frequency signals are easily directed to first stage amplifier 50 without distortion. Low frequencies may impinge on receiver probe 200 with periods that are longer than the length of probe 200.

Higher frequencies are also simultaneously conveyed across the slip ring air gap. As frequencies increase, wavelengths decrease and at some point the receiver probe would otherwise transition from a capacitive structure to a transmission line coupler. For example, if the receiver probe had a length of 100 mm, then the probe might begin to transition into a transmission line device at approximately a 1000 mm wavelength or 220 MHz (at the 75% propagation rate). Higher frequencies impinge on the receiver probe with periods that are shorter than the length of the probe.

Slip ring probes 100 and 200 utilize a unique continuous filtering mechanism embedded within the slip ring probe. Probes 100 and 200 show improved probe response over a range of digital data rates and protocols by effectively conveying only the proper component frequencies and waveform phase delays required to properly reconstruct the digital waveform after transition across non-contacting air gap 60.

Probes 100 and 200 are very accurate and may be used with any set of frequency components to reconstruct complex waveforms after transition across air gap 60, even more complex than a simple binary digital waveform reconstruction (i.e., PAM-4). This topology requires a continuously varying loss tangent in the conductive material. The slip ring probe may be constructed by a 3D printing method using a variable-doped material that increases the loss tangent along the length of the slip ring probe.

The slip ring probes 100 and 200 may be utilized for binary encoded digital waveforms. The slip ring probes 100 and 200 may also substantially reduce unwanted out-of-band noise that results in both timing skew and analog quantization errors. As a result, slip ring probes 100 and 200 apply to the accurate reconstruction of more complex communication waveforms across a space-gap, including but not limited to PAM-4 and PAM-8 waveforms and their derivatives. The accuracy of waveforms conveyed using the slip ring probe 100 and 200 also uses modulations other than binary, such as PAM-4 or QAM across rotating interfaces, thereby increasing data transfer rates while using the same channel bandwidth. Moreover, the slip ring probes 100, 200 may utilize other digital waveform encoding schemes that use alternative modulations such as PSK, FSK, ASK, QAM, OOK, CPM, QPSK, FM, AM, and derivatives of these modulation techniques.

The slip ring probes 100, 200 also improve probe response over a range of digital data rates and protocols by effectively conveying only the proper component frequencies and waveform phase delays required to properly reconstruct the digital waveform after the transition across non-contacting air gap 60.

The slip ring probes 100, 200 also improve signal quality of long run-length digital communications (e.g., SMPTE compliant video datastreams) and signal quality of 8b10b communications across rotating non-contacting interfaces. This results in faster data transfer rates across the same bandwidth channel without the increased cost of needing additional channel streams.

The slip ring probes 100, 200 may further be applied to rotating, linear motion, or stationary non-contacting communication systems. The composition of air gap 60 between the signal source and the slip ring probe 100, 200, though typically air, may be an air-like mixture, a vacuum, or a dielectric material of varying properties.

Figure 8:
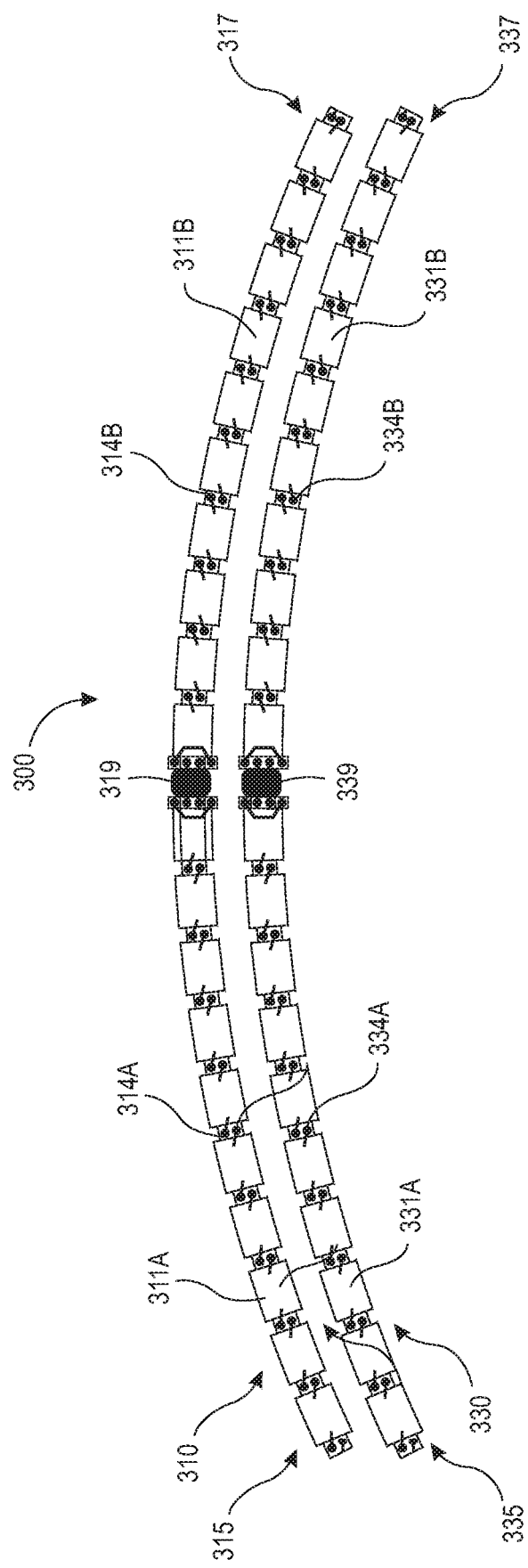
FIG. 8 is an enlarged top plan view of an alternative embodiment of the probe shown in FIG. 4.
Figure 9:
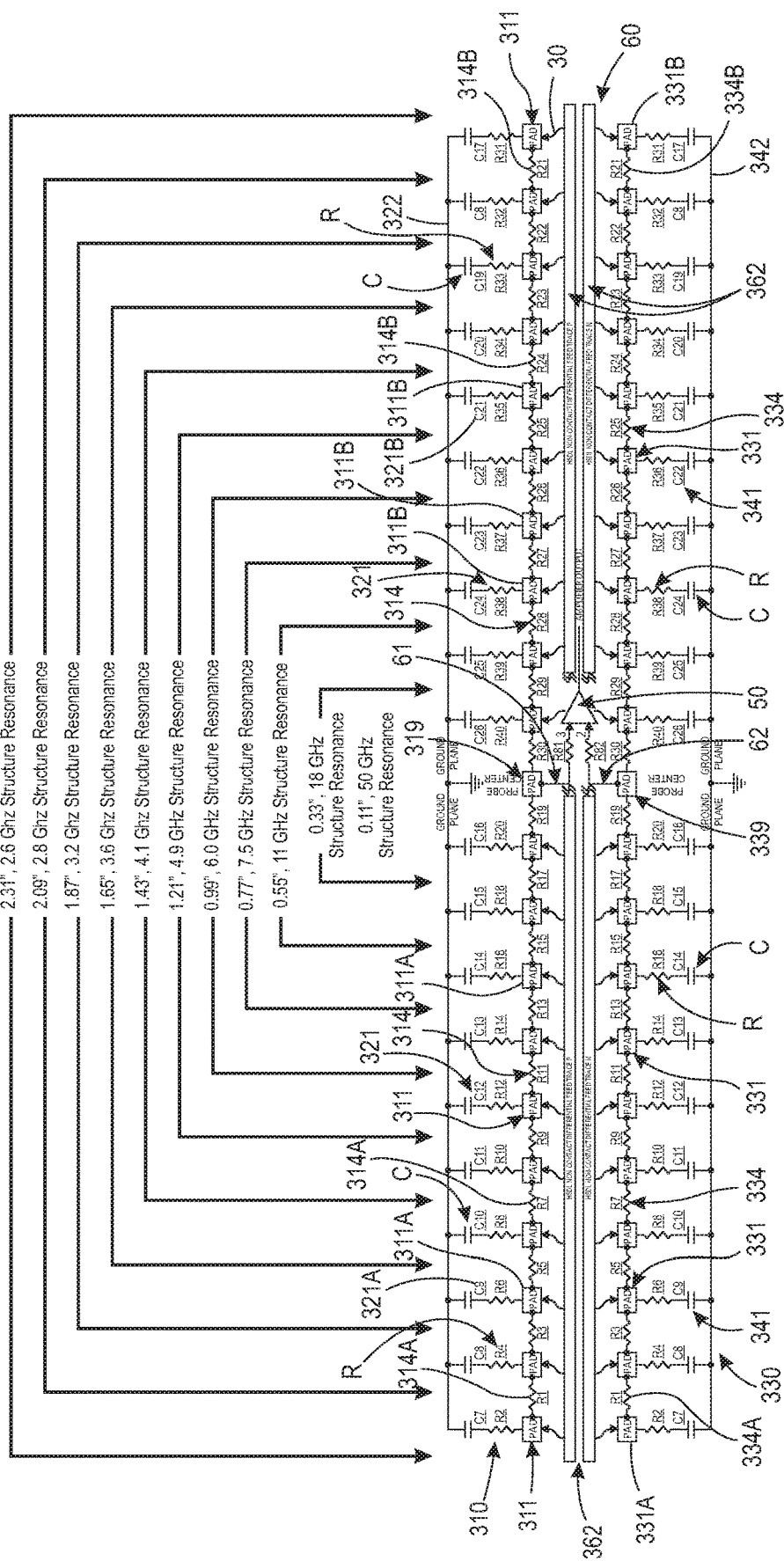
FIG. 9 is a schematic circuit diagram of the 10-segment probe shown in FIG. 8.

Referring now to FIGS. 8 and 9, a third embodiment of an improved slip ring probe is generally indicated at 300. As shown, probe 300 has a curved configuration similar to first embodiment probe 100 and may be used in the circular slip ring platter configuration of slip ring 115. Probe 300 also has a pair of segmented conductive strips 310 and 330, with first conductive strip 310 and second conductive strip 330 each having a length corresponding to the desired low frequency domain of the receiver and configured to receive signals 30 from trace feeds 362 of transmitter 16 across air gap 60 of the rotary joint. First conductive strip 310 and second conductive strip 330 of probe 300 are also not continuous and instead are formed from center segments 319 and 339 and a plurality of conductive segments or pads extending in either direction therefrom, severally indicated at 311 and 331 respectively, with such segments separated by resistors, severally indicated at 314 and 334 respectively, therebetween. However, probe 300 differs from probe 100 and 200 by using backend resistor R and capacitor C elements, severally indicated at 321 and 341, coupled to each of segments or pads 311 and 331, respectively, to decrease the frequency response for each of segments 311 and 331 as a function of their distance from or location relative to center segment 319 and 339, respectively. Each of conductive copper segments or pads 311 and 331 are thereby provided with a different frequency response and such frequency response decreases as they move away from the probe center and pads 319 and 339, respectively. Each of conductive segments 311 and 331 and resistors 314 and 334 have the same length. In this embodiment, resistors 314 and 334 are turned ninety degrees to shorten the separation between pads and two smaller resistors are disposed between center pads 319 and 339 and immediately adjacent pads 311 and 334, respectively.

Accordingly, slip ring probe 300 includes first conductive strip 310, with alternating conductive copper segments or pads 311 and resistors 314 forming the strip and RC elements 321 controlling pad frequency response along the strip, and second conductive strip 330, with alternating copper segments or pads 331 and resistors 334 forming the strip and RC elements 341 controlling pad frequency response along the strip, to attenuate the highest frequencies received at the extents of slip ring probe 300 and keep them from being transmitted to center copper segments or pads 319 and 339 of the respective first conductive strip 310 and second conductive strip 330 of slip ring probe 300. R/C frequency filter elements 321 and 341 are attached to the underside of each segment or pad 311 and 331. In this embodiment, the capacitance of each of capacitors C in filter elements 321 and 341 increases as a function of their distance from or location relative to center segments 319 and 339, such that the segments 311 and 331 immediately adjacent center pads 319 and 339 have the lowest capacitance and capacitors C at the segments on the ends of strips 310 and 330 have the highest capacitance. Thus, in this embodiment the capacitance at the center segments 319 and 339 is zero and such capacitance increases therefrom for each capacitor C for each segment 311 and 331 as they move away from the center of the probe so such segments respond to lower and lower frequencies as they move away from the center of the probe. Each of conductive copper segments or pads 311 and 331 are thereby provided with a different frequency response and such frequency response decreases as they move away from the probe center and pads 319 and 339, respectively. In this embodiment, the capacitance of capacitors C of each filter element 321 and 341 varies as a function of the corresponding segment 311, 331 distance from the center of the probe, but the resistance of the corresponding resistor R of each filter element 321 and 341 may be the same. Strip 310 is shown as having ten line resistors 314, line segments 311 and corresponding filter elements 321 on both sides of center segment and via 319. Strip 330 is shown as having ten line resistors 334, line segments 331 and corresponding filter elements 341 on both sides of center segment and via 339. However, more or less line resistors, line segments and filter elements may be utilized depending on a particular frequency range suitable for the intended purpose and understood by a person of ordinary skill in the art.

Slip ring probe 300 is a gradient frequency response probe that retains the segmented topology, but the higher frequency components are attenuated at each of conductive sections 311 and 331 by passive resistor R and capacitor C filters 321 and 341 (e.g., low pass filters), respectively, that effectively shunts the higher frequencies through a resistive component to ground plane 322 and 342. The R-C filters 321 and 341 are electrically coupled underneath each segment 311 and 331 of the respective first conductive strip 310 and the second conductive strip 330. Thus, in this embodiment, the slip ring probe 300 includes a passive resistive-capacitive multi-pole low-pass filter technique across the length of the probe 300 rather than mis-terminated transmission line segments. In either case, the farther the distance from the center tabs and the center informational taps 61 and 62, the more the upper frequency regions of signal 30 are attenuated.

The resistors R and the capacitors C shown in the circuit representation in FIG. 9 may be either discrete components, a mixture of discrete components and PCB embedded components, or all PCB embedded components. In addition, increasing the number of gradient frequency response (GFR) section components yields a more concise representation of the original digital waveform because all possible harmonic frequencies contained in a given digital signaling progression are accounted for with no gaps. In further embodiments, a GFR probe with many more and smaller segments will start to behave as an ideal, continuous GFR probe, as shown in FIG. 10.

FIG. 9 also illustrates the frequency structure resonance range being between 2.6 GHz and 11 GHz. However, a smaller or larger frequency structure resonance range may be utilized by the slip ring probe as suitable for the intended purpose and understood by a person of ordinary skill in the art.

In this embodiment, slip ring probe 300 may have an overall length of approximately 2.30 inches. Each receiver pad 311 and 331 may be approximately 0.11 inches long and 0.075 inches wide. The substrate of the slip ring probe 300 may be represented as $E_R$=~4, with a propagation speed of approximately 50% the speed of light (c). The resistors 314, 334 between the pads 311, 331 are situated vertically to minimize pad-to-pad spacing. The filter components R, C may be located at each pad and may comprise discrete and/or embedded components. The filter component R, C values are selected to pass the highest frequencies while avoiding structure resonance.

Figure 10:
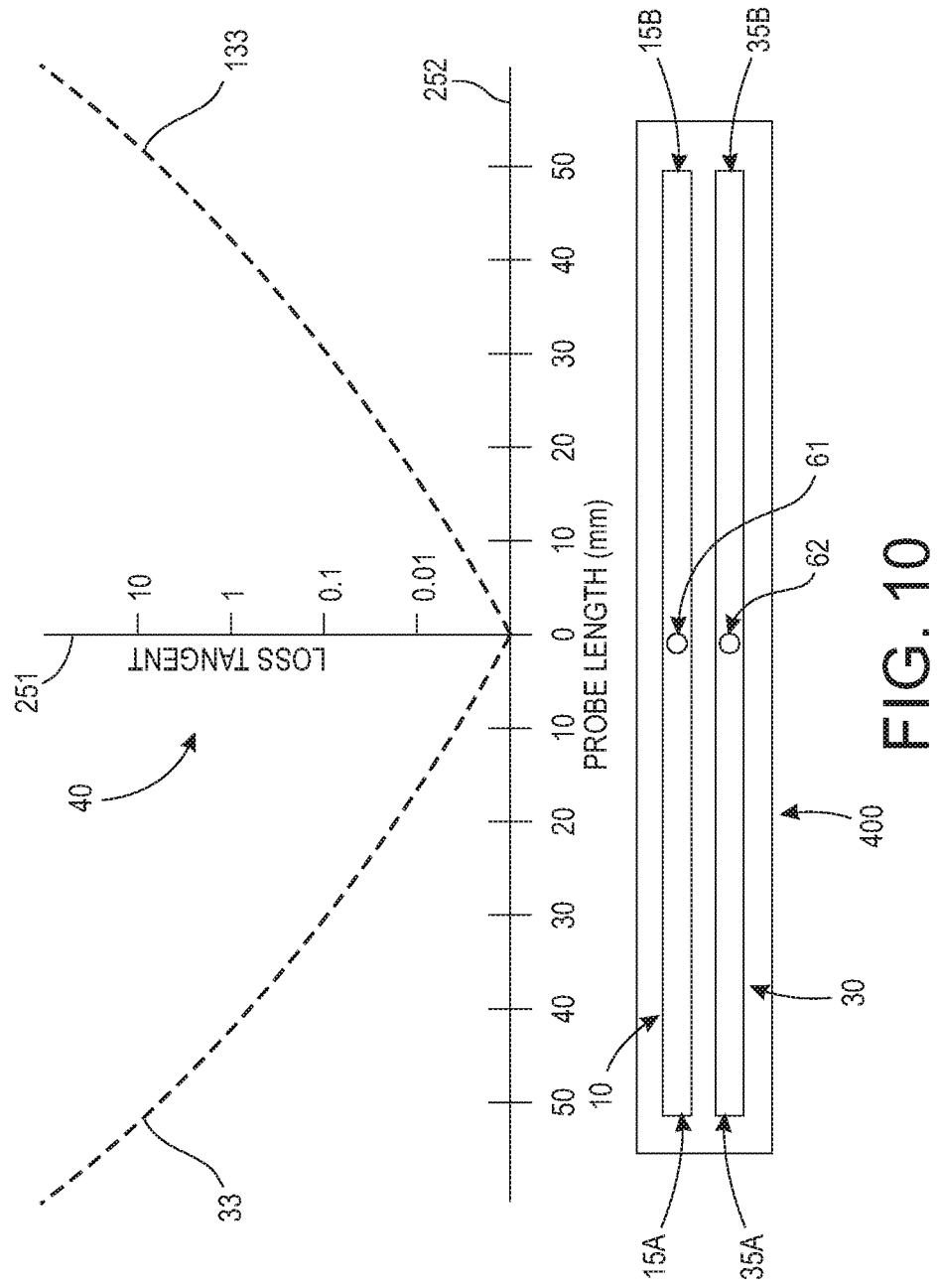
FIG. 10 is an enlarged top plan view of a slip ring probe with an ideal corresponding loss tangent graph.

FIG. 10 illustrates an ideal loss tangent graph 40 with a loss tangent axis 251 and a probe length axis 252. FIG. 10 further illustrates slip ring probe 400 with a continuously degrading frequency response 33 along the length of the slip ring probe. The outer extremities of the slip ring probe, towards the first ends 15A, 15B and the second ends 35A, 35B of the slip ring probe, have greater high-frequency loss. The inner portion of the slip ring probe, nearest the center-tap or via 61, 62 have almost no loss at high frequencies. This allows the higher frequencies to feed the amplifier 50 at the center-tap 61, 62 of the slip ring probe and constrain wavelengths (frequencies) to a portion of the conductive material 10, 30 of the slip ring probe to be short enough as to not form a transmission line along the length of the slip ring probe. As the conductive segments and resistors between the conductive segments get smaller and smaller, the loss tangent graph for the probe approaches the ideal shown in FIG. 10.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination.

The present disclosure contemplates that many changes and modifications may be made. Therefore, while forms of the improved probe have been shown and described, and a number of alternatives discussed, persons skilled in this art will readily appreciate that various additional changes and modifications may be made without departing from the scope of the invention, as defined and differentiated by the following claims.

What is claimed is:

1. A non-contacting rotary joint for transmission of electrical signals across a non-contacting interface defined between two relatively-movable members, comprising:
a transmitter configured to transmit a signal across a non-contacting interface;
a near-field probe arranged in spaced relation to said transmitter and operatively arranged to receive said signal transmitted across said interface;
said near-field probe having a signal capture area for receiving said signal transmitted across said interface;
said signal capture area comprising a segmented signal receiving strip having a length sized for a desired low frequency signal content of said signal and configured to receive a range of frequency signal content of said signal that includes said desired low frequency signal content of said signal, said segmented signal receiving strip comprising:
a first signal receiving segment having a first frequency response;
a second signal receiving segment having a second frequency response and electrically coupled to said first signal receiving segment;
a third signal receiving segment having a third frequency response and electrically coupled to said first signal receiving segment;

said second frequency response of said second signal receiving segment being less than said first frequency response of said first signal receiving segment; and said third frequency response of said third signal receiving segment being less than said first frequency response of said first signal receiving segment; and receiving electronics operatively arranged to receive said range of frequency signal content received by said segmented signal receiving strip via said first signal receiving segment.

2. The non-contacting rotary joint of claim 1, wherein:
said first signal receiving segment has a first length;
said second signal receiving segment has a second length greater than said first length; and
said third signal receiving segment has a third length greater than said first length.

3. The non-contacting rotary joint of claim 2, wherein said segmented signal receiving strip comprises:
a first dissipation element positioned between the first signal receiving segment and the second signal receiving segment and configured to isolate said first signal receiving segment from said second signal receiving segment; and
a second dissipation element positioned between said first signal receiving segment and said third signal receiving segment and configured to isolate said first signal receiving segment from said third signal receiving segment.

4. The non-contacting rotary joint of claim 3, wherein said first dissipation element and said second dissipation element each comprise a resistor.

5. The non-contacting rotary joint of claim 1, wherein said second signal receiving segment comprises an electrically coupled resistor and capacitor arranged to provide a signal filter and said third signal receiving segment comprises an electrically coupled resistor and capacitor arranged to provide a signal filter.

6. The non-contacting rotary joint of claim 5, wherein:
said first signal receiving segment has a first length;
said second signal receiving segment has a second length equal to said first length; and
said third signal receiving segment has a third length equal to said first length.

7. The non-contacting rotary joint of claim 5, wherein said segmented signal receiving strip comprises:
a first dissipation element positioned between the first signal receiving segment and the second signal receiving segment and configured to isolate said first signal receiving segment from said second signal receiving segment; and
a second dissipation element positioned between said first signal receiving segment and said third signal receiving segment and configured to isolate said first signal receiving segment from said third signal receiving segment.

8. The non-contacting rotary joint of claim 1, wherein said first signal receiving segment, said second signal receiving element and said third signal receiving element each comprise copper.

9. The non-contacting rotary joint of claim 1, wherein:
said first frequency response of said first signal receiving segment corresponds to a first frequency subrange of said range of frequency signal content of said signal; and said second frequency response of said second signal receiving segment corresponds to a second frequency subrange of said range of frequency signal content of said signal; and said first frequency subrange of said range of frequency signal content of said signal is greater than said second frequency subrange of said range of frequency signal content of said signal.

10. The non-contacting rotary joint of claim 1, wherein said signal transmitted across said non-contacting interface by said transmitter is a high-speed digital data output signal.

11. The non-contacting rotary joint of claim 1, wherein:
said transmitter comprises a signal source operatively arranged to provide a high speed digital data output signal, a controlled-impedance differential transmission line having a source gap and a termination gap, a power divider operatively arranged to receive said high-speed digital data output signal from said signal source, and to supply said high-speed digital data output signal from said signal source to said source gap of said controlled-impedance differential transmission line; and
said near-field probe is arranged in spaced relation to said controlled-impedance differential transmission line and is operatively arranged to receive said signal transmitted across said non-contacting interface by said transmitter.

12. The non-contacting rotary joint of claim 1, wherein said segmented signal receiving strip comprises:
at least two additional signal receiving segments;
each of said additional signal receiving segments having a frequency response and being electrically coupled to said first signal receiving segment; and
wherein said frequency response of each additional signal receiving segment decreases the further said additional signal receiving segment is from said first signal receiving segment.

13. The non-contacting rotary joint of claim 12, comprising at least one dissipation element positioned between each of said second signal receiving segment, said third signal receiving segment, and said additional signal receiving segments, and said dissipation elements configured to isolate said respective signal receiving segments from each other.

14. The non-contacting rotary joint of claim 12, wherein the length of each additional signal receiving segment increases the further said additional signal receiving segment is from said first signal receiving segment.

15. The non-contacting rotary joint of claim 12, wherein each of said second signal receiving segment, said third signal receiving segment, and said additional signal receiving segments comprise an electrically coupled resistor and capacitor arranged to provide a signal filter.

16. The non-contacting rotary joint of claim 1, wherein said first signal receiving segment comprises a center tap communicating with said receiving electronics.

17. The non-contacting rotary joint of claim 1, comprising:
a second segmented signal receiving strip orientated parallel to said segmented signal receiving strip;
said second segmented signal receiving strip comprising:
a first signal receiving segment having a first frequency response;
a second signal receiving segment having a second frequency response and electrically coupled to said first signal receiving segment;

a third signal receiving segment having a third frequency response and electrically coupled to said first signal receiving segment;

said second frequency response of said second signal receiving segment being less than said first frequency response of said first signal receiving segment; and said third frequency response of said third signal receiving segment being less than said first frequency response of said first signal receiving segment; and said receiving electronics operatively arranged to receive signal content received by said second segmented signal receiving strip via said first signal receiving segment of said second segmented signal receiving strip.

* * * * *